UNITED STATES PATENT OFFICE.

JAMES F. THOMPSON, OF ROCKLAND, MASSACHUSETTS.

BURNISHING-WAX FOR USE IN FINISHING THE EDGES OF THE HEELS AND SOLES OF BOOTS AND SHOES.

SPECIFICATION forming part of Letters Patent No. 305,981, dated September 30, 1884.

Application filed August 25, 1884. (No specimens.)

*To all whom it may concern:*

Be it known that I, JAMES F. THOMPSON, of Rockland, in the county of Plymouth, State of Massachusetts, have invented a new and useful Improvement in Burnishing-Wax for use in Finishing the Edges of the Heels and Soles of Boots and Shoes, of which the following is a specification.

The object of my invention is the production of a wax which will give a superior finish and polish to the sole-edges, and which can be supplied to the trade at a less cost than the wax commonly used.

The chief ingredients of my improved burnishing-wax are the substances known commercially as Brazil wax, ceresin, and paraffine, with gum-benzoin added, chiefly to give the compound a more agreeable odor, and with the addition, also, of some coloring-matter, such as aniline.

For the best results I mix the substances in the following proportions: To produce one pound of burnishing-wax, I use of Brazil wax, ten ounces; of ceresin, five ounces; of paraffine, one-half ounce; of gum-benzoin, half an ounce, and a suitable quantity of aniline color. My wax may also be cheapened by the use of Japan wax in the place of a portion of the Brazil wax and ceresin, and when this is done to any considerable extent resin is added to harden the mass and supply the hardening effect of the Brazil wax, which the Japan wax does not possess, and which, if the Japan wax is used in considerable quantities without the addition of resin or some hardening substance, would make the burnishing-wax softer than is desirable. A tolerably good result may also be obtained without the use of paraffine when Japan wax is used, but I prefer to use paraffine in about the proportion heretofore specified.

In preparing the wax the ingredients are together placed in a vessel, preferably of iron, and subjected to heat sufficient to thoroughly melt them. While melting the mass is stirred to thoroughly mix the ingredients, and when this has been accomplished the gum-benzoin and aniline coloring-matter are added and the whole left to cool. When it has cooled partially, but while it is yet hot enough to pour, it is run into molds, in which it hardens and acquires its permanent form for the market.

What I claim is—

A burnishing-wax consisting of Brazil wax, ceresin, paraffine, and gum-benzoin, with or without Japan wax or resin, mixed with the aid of heat in the proportions and substantially as specified.

JAMES F. THOMPSON.

Witnesses:
WM. A. MACLEOD,
H. E. BARRY.